United States Patent
Gegalski et al.

[19]

[11] Patent Number: 6,050,654
[45] Date of Patent: Apr. 18, 2000

[54] ELECTROMAGNETIC VALVE ARRANGEMENT AND VEHICLE BRAKING SYSTEM COMPRISING SAID ELECTROMAGNETIC VALVE ARRANGEMENT

[75] Inventors: Helmut Gegalski, Mühlheim-Kärlich; Dieter Voges, Koblenz; Stephen Philip John Barr, Nauort; Leo Gilles, Koblenz, all of Germany

[73] Assignee: Lucas Industries Public Limited Company, Solihull, United Kingdom

[21] Appl. No.: 08/971,912

[22] Filed: Nov. 17, 1997

Related U.S. Application Data

[63] Continuation of application No. PCT/EP96/02156, May 20, 1996.

[30] Foreign Application Priority Data

May 18, 1995 [DE] Germany .......................... 195 18 333

[51] Int. Cl.[7] ...................................................... B60T 8/36
[52] U.S. Cl. ................................. 303/119.2; 251/129.02
[58] Field of Search ............................. 303/116.1, 116.2, 303/116.3, 116.4, 119.2, 119.3; 137/891, 892, 861, 862, 863, 864, 625.18; 251/129.02

[56] References Cited

U.S. PATENT DOCUMENTS

| | | |
|---|---|---|
| 4,844,558 | 7/1989 | Ishii et al. ............................ 303/116.1 |
| 5,221,129 | 6/1993 | Takasaki ............................... 303/119.2 |
| 5,332,304 | 7/1994 | Maas ..................................... 303/119.2 |
| 5,472,266 | 12/1995 | Volz et al. ........................... 303/119.2 |
| 5,628,550 | 5/1997 | Zaviska et al. ...................... 303/119.2 |
| 5,678,902 | 10/1997 | Farr et al. ............................ 303/119.2 |
| 5,860,709 | 1/1999 | Hosoya ................................ 303/116.1 |

FOREIGN PATENT DOCUMENTS

| | | |
|---|---|---|
| 0452174A1 | 10/1991 | European Pat. Off. . |
| 0479044A1 | 4/1992 | European Pat. Off. . |
| 4034839C1 | 3/1992 | Germany . |
| 4427800A1 | 2/1996 | Germany . |

*Primary Examiner*—Paul N. Dickson
*Assistant Examiner*—Robert A. Siconolfi
*Attorney, Agent, or Firm*—Wood, Herron, & Evans, L.L.P.

[57] ABSTRACT

The invention relates to an electromagnetic valve arrangement, preferably for a pressure medium of a vehicle braking system, comprising an electromagnet arrangement which is coupled with a valve closing means which can be brought into several positions, a housing with a first, a second, a third, and a fourth connection of which, in a first position, the first and the second connection are in flow connection with each other, and the third and the fourth connection are blocked; in a second position, the first, the second, the third, and the fourth connection are blocked; in a third position, the first and the second connection are blocked, and the third and the fourth connection are connected with each other; and in a fourth position, the first and the third connection are connected with each other, and the second and the fourth connection are blocked.

26 Claims, 13 Drawing Sheets

ELECTROMAGNETIC VALVE ARRANGEMENT AND VEHICLE BRAKING SYSTEM COMPRISING SAID ELECTROMAGNETIC VALVE ARRANGEMENT

The present application is a continuation of applicant's PCT application PCT/EP96/02156, filed May 20, 1996, currently pending, and claiming priority of German Patent No. 195 18 333.9, filed May 18, 1995.

The present invention relates to an electromagnetic valve arrangement, preferably for a pressure medium of a vehicle braking system, comprising an electromagnet arrangement which is coupled with a valve closing means which can be brought into several positions, a housing with a first, a second, a third, and a fourth connection.

Valve arrangements of this type of the most different configurations are known in the state of the art.

Known valve arrangements of this type, however, are disadvantageous in that some combinations of connections or disconnections, respectively, between the four connections can only be made with difficulties. An explicit blocking position which can be achieved from several positions and in which all connections are interlocked, in particular, can only be achieved with considerable engineering effort.

The present invention is therefore based on the object to improve a valve arrangement of the initially mentioned type in such a manner that the previously explained drawbacks are eliminated.

For this purpose, the valve arrangement of the initially mentioned type is developed in such a manner that in a first position the first and the second connection are connected with each other, and the third and fourth connection are blocked; in a second position the first, second, third, and fourth connection are blocked; in a third position the first and second connection are blocked, and the third and fourth connection are connected with each other; and in a fourth position the first and third connection are connected with each other, and the second and fourth connection are blocked.

After a pressure build-up it is thus possible by means of a simple control to realise a defined pressure keeping phase which may be necessary when using such valve arrangements for example in hydraulic robot actuators, vehicle braking systems or the like. The entry into the pressure keeping phase, in particular, is without transition; that is, no pressure medium is transferred into a medium reservoir so that the built-up pressure is fully maintained.

The first valve member is preferably associated with a pressure reduction stage which reduces the pressure prevailing in the pressure medium between at least two outlets. This enables an infinitely variable pressure build-up gradient without a switching operation being carried out by the valve arrangement. After a pressure keeping phase, the valve arrangement only becomes operative when a pressure relief takes place.

In a preferred embodiment of the invention the valve closing means has a first valve member which is coupled with an armature of the electromagnet arrangement, wherein the valve closing means is either of single-piece design or comprises a second valve member and an actuating means for the second valve member, which is coupled with an armature of the electromagnet arrangement. The single-piece configuration of the valve closing means is advantageous in that it can be realised with very few components.

In the two-piece configuration of the valve closing means the two valve members can be arranged coaxially and at opposite ends of the armature of the electromagnet arrangement. In order to enable the pressure medium to flow from the first to the second valve member bypassing the armature, the armature preferably comprises passages at its outside in the form of grooves or longitudinal holes through which the pressure medium is capable of flowing.

In this case, the first valve member is biased against the armature of the electromagnet by a first spring arrangement, and the second valve member is biased against a valve seat by a second spring arrangement.

Moreover, the armature of the electromagnet arrangement is biased against the actuation direction (B) of the first valve member by a third spring arrangement.

Said third spring arrangement bears against the housing or the valve seat on the one hand, and against the armature, on the other hand.

At least the first valve member comprises a passage which, as a function of the position of the valve member, can be connected or disconnected via passages with/from one or several of the first, second, third or fourth connection. The second valve member can be realised as a ball valve.

The pressure reduction stage is preferably formed in a passage and comprises a diaphragm with a predeterminable passage for the pressure medium. The pressure build-up can be achieved in a highly dynamic manner by correspondingly dimensioning the stepped bore or the diaphragm, respectively.

In preferred embodiments of the invention the first and third spring arrangement are biased in opposite directions against the armature of the electromagnet arrangement. Preferably the first spring arrangement has a biasing force which is smaller than that of the third spring arrangement. It is thereby possible to influence switching from one position into another by a suitable selection and cooperation of the forces generated by the electromagnet arrangement, the pressure of the pressure medium and the otherwise specified dimensions of the valve arrangement.

Upon an actuation of the electromagnet arrangement in order to bring the valve closing means from a first position in which the electromagnet arrangement is not actuated into another position in which the electromagnet arrangement is actuated, in particular, the third spring arrangement is compressible by the magnetic force of the electromagnet arrangement, the spring force of the first spring arrangement and a force which results from a pressure difference which may possibly prevail at the pressure reduction stage.

In particular, when the electromagnet arrangement comprises a proportional electromagnet which, on application of current of varying amperage, brings the valve closing means into different positions, any pressure build-up gradient (limited only by the stepped bore or the diaphragm, respectively) can be realised.

In an actuated position in which the valve closing means is deflected from the not actuated position to its maximum the spring force of the first spring arrangement is preferably greater than or equal to zero.

In an embodiment of the electromagnetic valve arrangement which is particularly well suited for certain applications the annular duct in the first valve member, which connects or disconnects, respectively, the first connection with/from the passage, can be aligned in such a manner that when a pressure difference prevails at the pressure reduction stage a certain flow area for the pressure medium entering the annular duct is obtained.

As a function of the current through the electromagnet arrangement the flow of the pressure medium at the pressure reduction stage may furthermore be variable in such a manner that with a low current through the electromagnet arrangement a high pressure build-up gradient, and with a high current through the electromagnet arrangement a low pressure build-up gradient is obtained at the downstream outlet associated with the pressure reduction stage.

The invention also relates particularly advantageously to a vehicle braking system comprising an electromagnet arrangement of said type, wherein the vehicle braking system includes a brake booster which can be operated via a brake pedal and acts upon a master cylinder, a pump arrangement for a pressure medium, which is associated with a reservoir for the pressure medium, as well as at least one braking mechanism. The first connection of the valve arrangement is connected with the master cylinder, the second and third connection of the valve arrangement are connected with the braking mechanism, and the fourth connection of the valve arrangement is connected with the pressure accumulator.

In addition, the invention also relates to a vehicle braking system comprising an electromagnetic valve arrangement as has been described above, a brake booster which can be operated via a brake pedal and which acts upon a master cylinder, a pump arrangement for a pressure medium, which is associated with a reservoir for the pressure medium, as well as at least one braking mechanism, characterised in that the first connection of the valve arrangement is connected with the master cylinder, the second and third connection of the valve arrangement are connected with the braking mechanism, and the fourth connection of the valve arrangement is connected with the pressure accumulator and/or the pump arrangement.

In a further embodiment of the electromagnetic valve arrangement the valve closing means can be brought into a fifth position and the housing is provided with a fifth connection, with the second and the fifth connection being in flow connection with each other in the fifth position, while the first, third, and fourth connection are blocked.

In this embodiment of the electromagnetic valve arrangement the fifth connection is preferably blocked in the other positions.

The invention finally relates to a vehicle braking system comprising an electromagnetic valve arrangement as has been described above, comprising a sensor means for sensing the static and dynamic conditions at a brake pedal, an electronic controller for generating control signals for the electromagnetic valve arrangement as a function of the static and dynamic conditions occurring at the brake pedal, a source supplying pressurised hydraulic fluid, a reservoir for the pressure medium, as well as at least one braking mechanism, characterised in that the first connection of the valve arrangement is connected with the source supplying pressurised hydraulic fluid, the second and third connection of the valve arrangement are connected with the braking mechanism, and the fourth and fifth connection of the valve arrangement are connected with the reservoir.

Further advantages, properties and characteristics of the invention will be described in the following with reference to the accompanying drawings.

FIG. 1 schematically shows a first embodiment of an electromagnetic valve arrangement as a longitudinal section.

FIGS. 2a to 2d show the different positions of the electromagnetic valve arrangement of FIG. 1.

FIG. 3 schematically shows a second embodiment of the electromagnetic valve arrangement as a longitudinal section.

Figure 6:
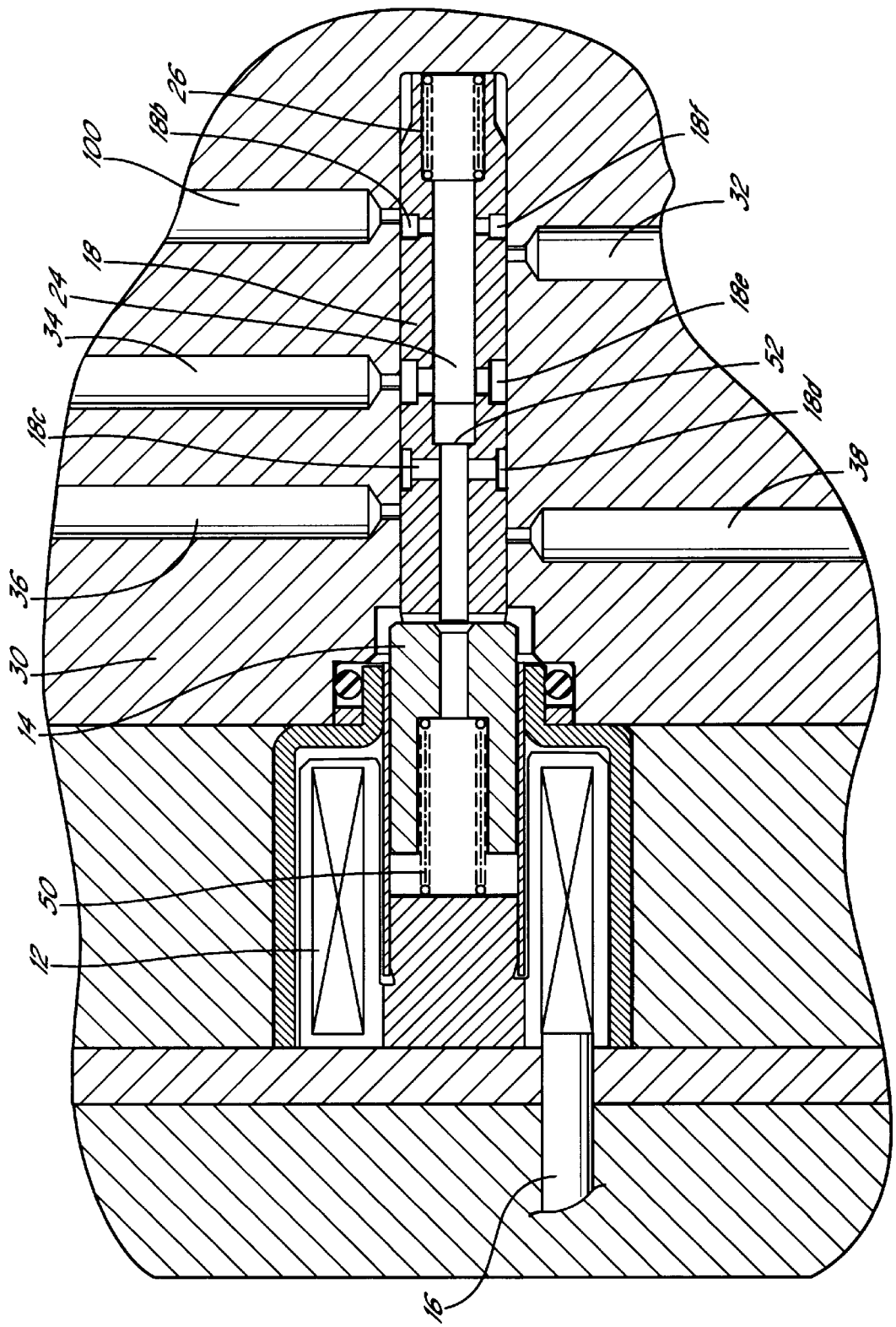

FIG. 6 schematically shows a third embodiment of the electromagnetic valve arrangement as a longitudinal section.

Figure 7:
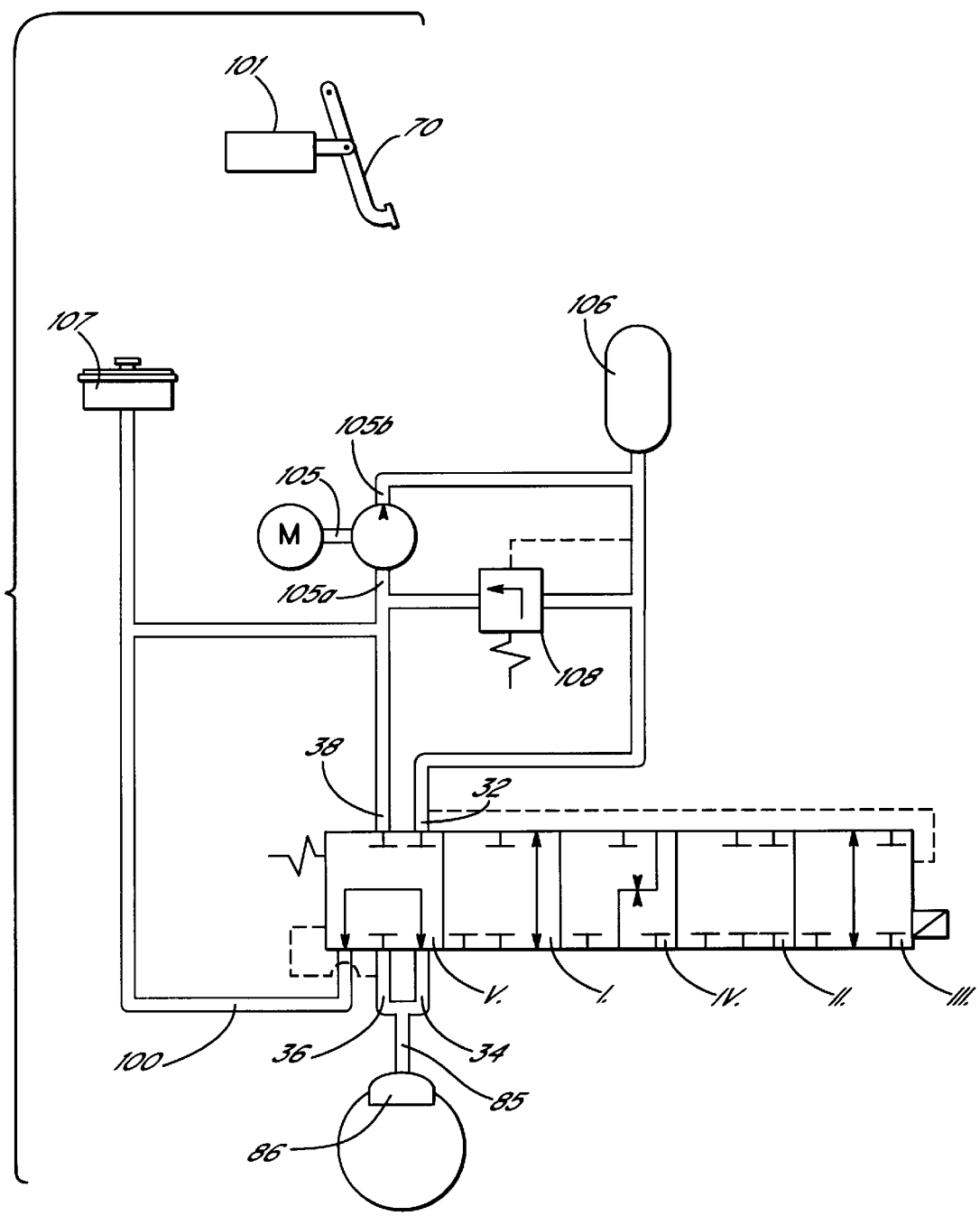

FIG. 7 shows a vehicle braking system with an electromagnetic valve arrangement according to FIG. 6.

Figure 8:
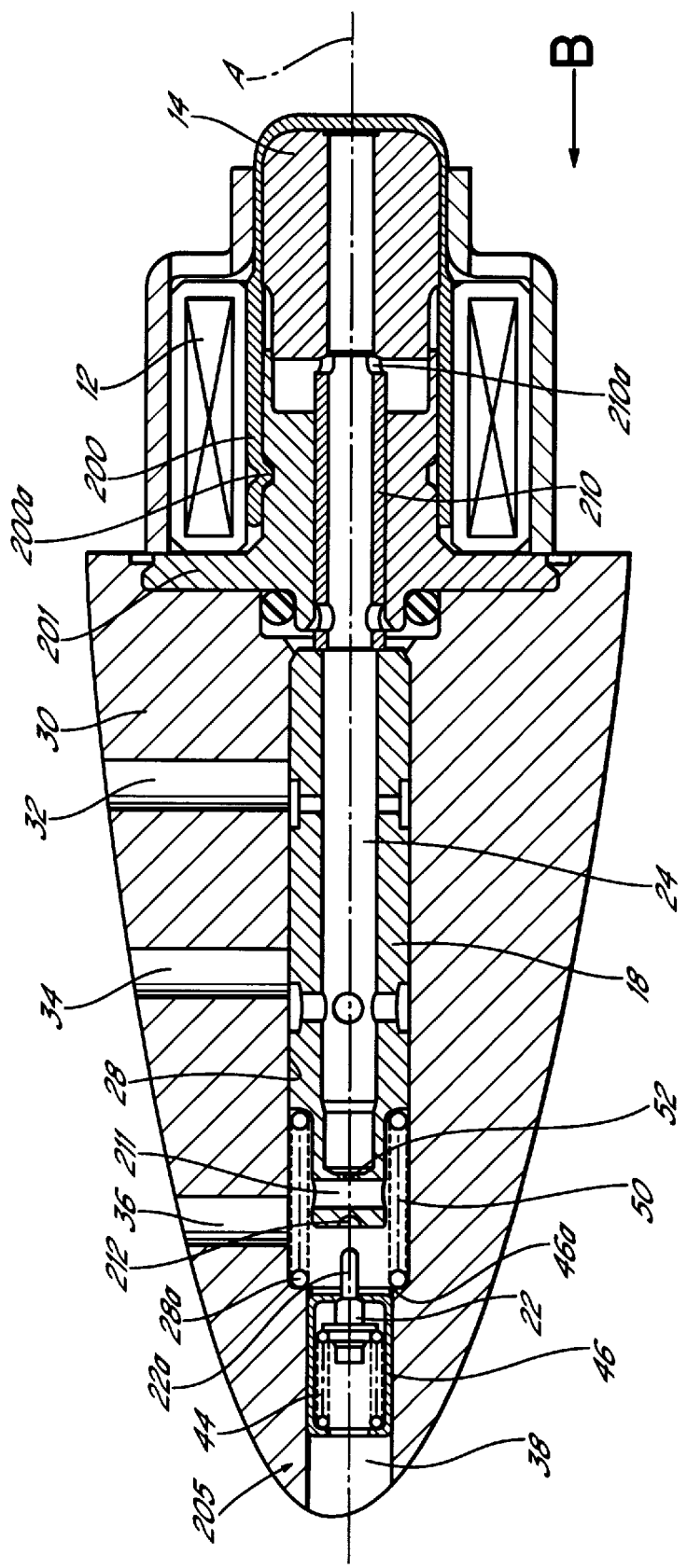

FIG. 8 schematically shows a fourth embodiment of the electromagnetic valve arrangement as a longitudinal section.

Figure 9:
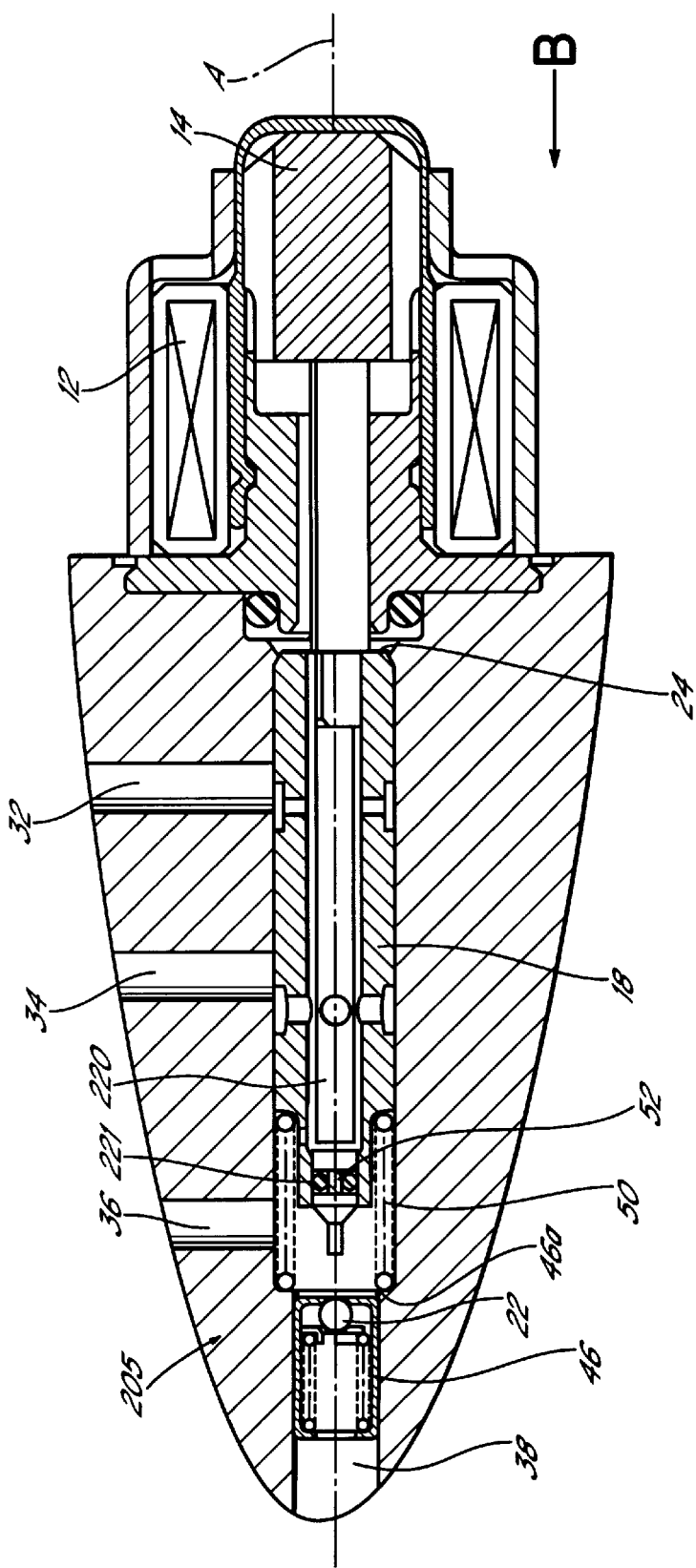
Figure 9A:
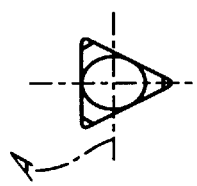

FIGS. 9, 9a schematically show a fifth embodiment of the electromagnetic valve arrangement as a longitudinal section.

Figure 10:
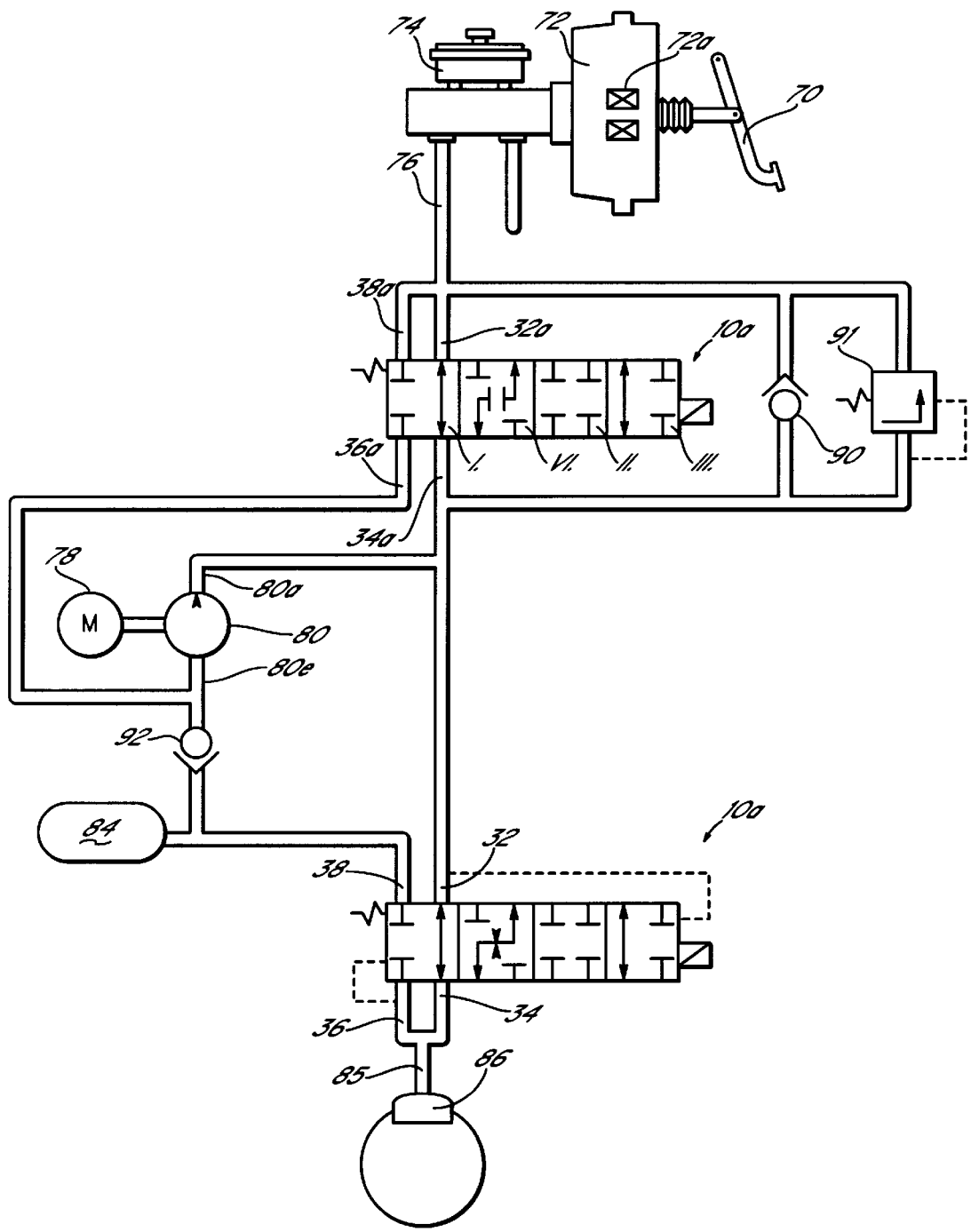

FIG. 10 shows a vehicle braking system with an electromagnetic valve arrangement according to FIG. 1, 3, 8 or 9.

Figure 1:
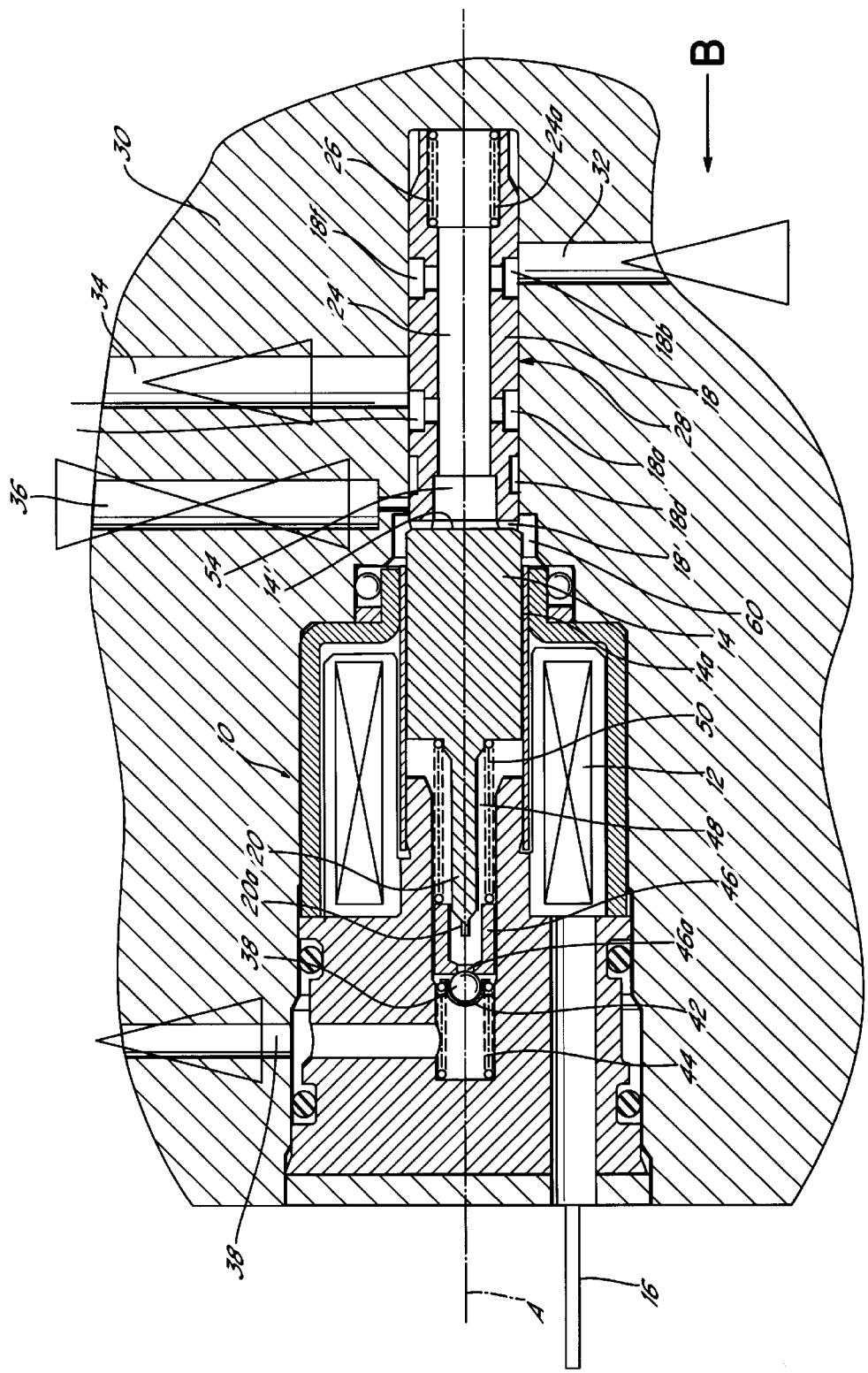

FIG. 1 shows an electromagnetic valve arrangement which is generally identified by 10, comprising a cylindrical coil 12 and an armature 14 which is guided within the coil 12. Upon applying a current via a line 16 through an electronic controller (not shown) to the coil 12 the armature 14 is movable along the longitudinal axis A. Preferably, a proportional electromagnet arrangement is used where the deflection of the armature 14 is effected as a function of the supplied current. The armature 14 is coaxially coupled with a first valve member 18 and a pin-shaped actuating means 20 for a second valve member 22.

The first valve member 18 is accommodated in a cylindrical hole 28 in a housing 30 and has the shape of a tubular sleeve which is provided with a passage 24 which extends coaxially to the longitudinal axis A. At the circumference of the valve member 18 a first, second and third circumferentially extending annular duct 18d, 18e, 18f are formed, with a first and second radial passage 18a, 18b leading from the second and third annular duct 18e, 18f to a passage 24. The first valve member 18 is axially biased against the armature 14 by means of a first spring arrangement in the form of a cylindrical coil spring 26. For this purpose, the end of the passage 24 which is remote from the armature 14 is provided with a radially expanding shoulder 24a against which the biased coil spring 26 bears.

In addition, the housing 30 comprises a first connection 32, a second connection 34, a third connection 36 as well as a fourth connection 38. A preferably hydraulic pressure medium can be fed to and from the electromagnetic valve arrangement through the connections 32, . . . , 38. For this purpose, the first connection 32 is associated with the third annular duct 18f, the second connection 34 is associated with the second annular duct 18e, and the third connection 36 with the first annular duct 18d.

The second valve member is formed by a ball 22 which bears against a valve seat 46 via a ball cage 42 by means of a second spring arrangement in the form of a cylindrical coil spring 44. Said valve seat 46 is formed by a sleeve which is interference-fitted in a cylindrical hole 48 which extends coaxially with the axis A. The sleeve has a passage 46a through which the pressure medium can flow to the fourth connection 38 in the opened position.

The actuation means 20 which is connected with the armature 14 has at its front end a pin-shaped taper 20a the diameter of which is so dimensioned that the ball 22 can be lifted off the valve seat 46 against the force of the spring 44 by forming an annular gap with the wall of the passage 46a.

A third spring arrangement in the form of a coil spring 50 surrounding the actuating means 20 is arranged so as to be biased between the sleeve-shaped valve seat 46 and the armature 14 so that the armature 14 is biased against the actuating direction of the first valve member 18. This is achieved as a result of the biasing force of the third spring 50 being higher than the biasing force of the first spring 26.

The passage 24 in the first valve member 18 has a stepped expansion 54 at its end facing towards the armature 14, in which a diaphragm 52 with a predeterminable passage for the pressure medium is arranged.

At the face end 18' facing towards the armature 14 the first valve member 18 comprises passages which extend radially outwards from the passage 24 so that pressure medium from the passage 24 can flow into an annular chamber 60 surrounding the end of the armature 14 facing towards the first valve member 18, and from there along the passages 14a of the armature 14, which are distributed over the circumference, into the space 48 to the second valve seat 46.

The function of the electromagnetic valve arrangement shown in FIG. 1 will be explained in the following with reference to FIGS. 2a to 2d.

Figure 2A:
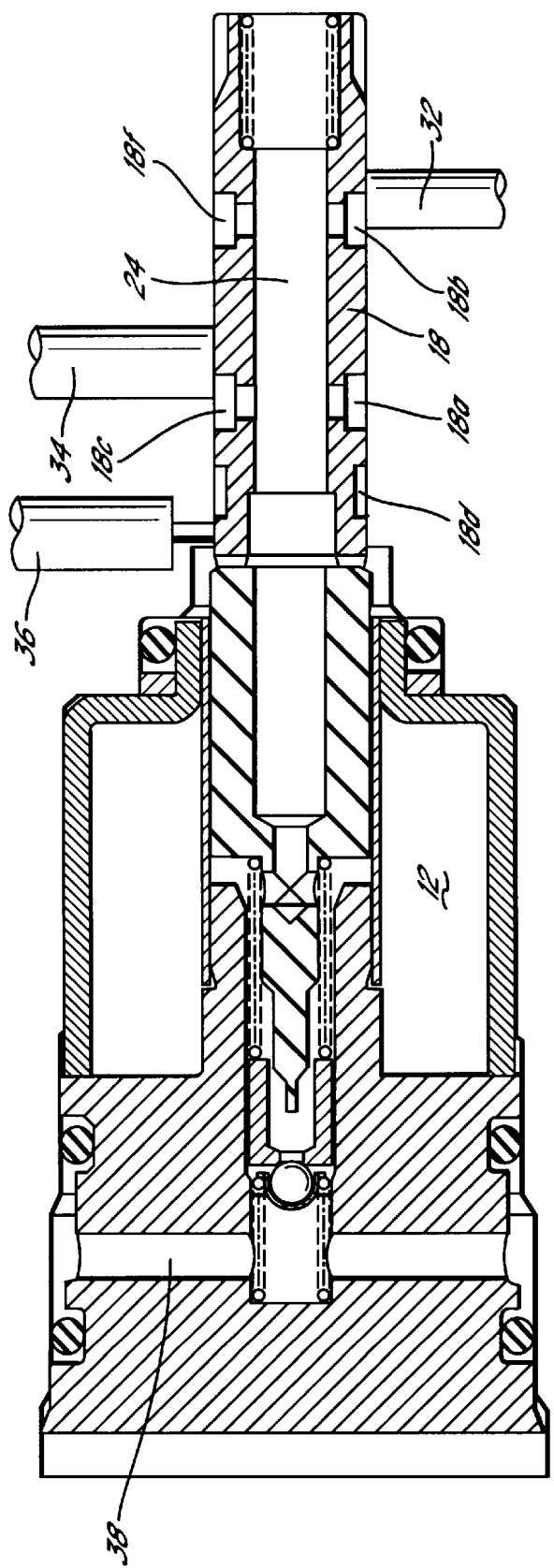

FIG. 2a shows the electromagnetic valve arrangement in a first (not actuated) position (I.). Here, the first connection 32 is connected with the passage 24 via the annular duct 18f and the passage 18b. The passage 24 communicates with the connection 34 via the passage 18a and the annular duct 18e. In this not actuated position (I.) the third connection 36 is offset with respect to the annular duct 18d in such a manner that the connection 36 does not communicate with the chamber 60.

Figure 2B:
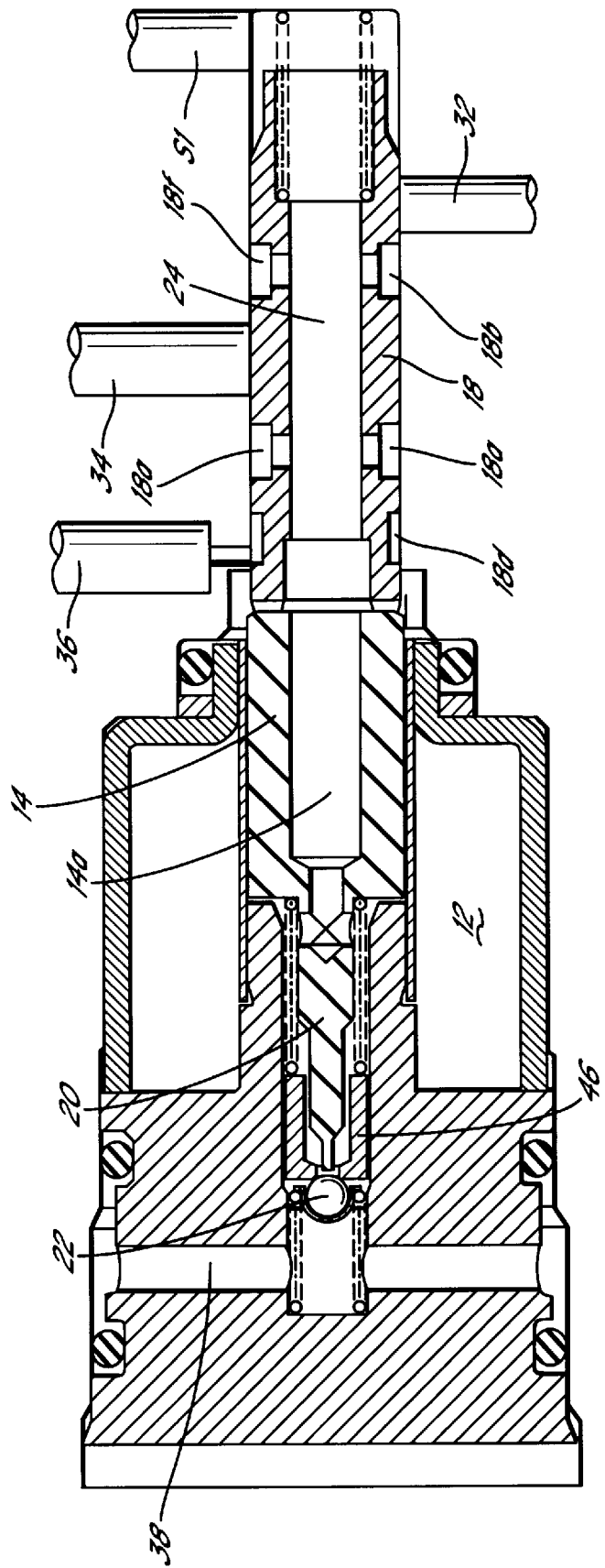

In order to bring the first valve member 18 into its second (actuated) position (II.) as shown in FIG. 2b, it is necessary to apply a current with a predetermined amperage $I_1$ to the coil 12. The consequence of this is that the armature 14 moves against the spring 50 towards the second valve member 22 (upwards in FIG. 2b) and is assisted by the the spring 26 so that the first valve element 18 also moves upwards by the distance $s_1$. In this second position (II.) the connection 32 is axially offset relative the annular duct 18f to such an extent that the connection 32 is blocked. The second connection 34 is axially offset relative to the annular duct 18a in the same manner so that the second connection 34, too, is blocked. The third connection 36 communicates with the space 48 via the annular duct 18d, the chamber 60 and the passage 14a. (Compared to FIG. 1, the passage 14a is formed here as the central passage 14a through the armature 14, which communicates with the chamber 60 via the passages arranged in the face 18' of the valve member 18). The movement carried out by the armature 14—and thus by the actuation means 20 as well—towards the second valve member 22 is, however, not sufficient for lifting the valve member 22 off the valve seat 46. The second spring 44 is dimensioned in such a way that it cannot be compressed by the pressure medium applied to the third connection 36 without the ball 22 being lifted off the valve seat 46. This means that the third connection 36 and the fourth connection 38 are also blocked.

Figure 2C:
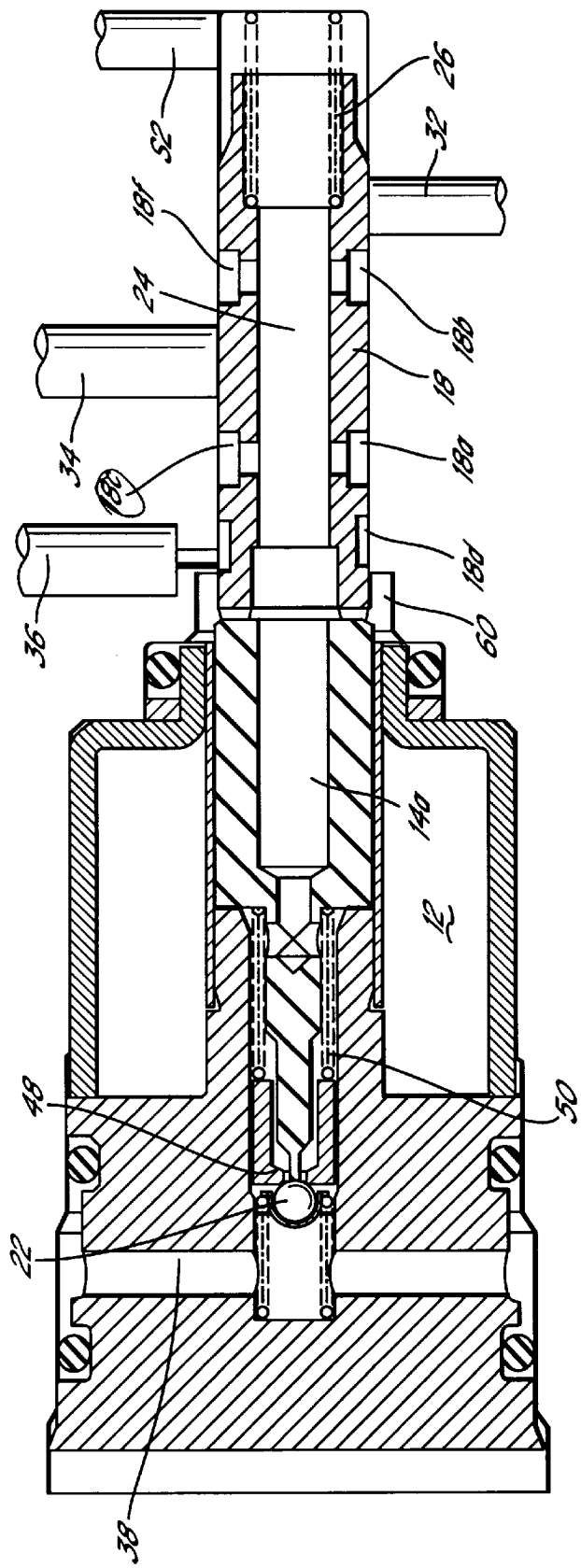

In the third position (III.) of the valve arrangement as shown in FIG. 2c the coil 12 is applied with a current $I_2$ of such an amperage that the armature 14 moves upwardly by the distance 52 towards the second valve member 22 against the force of the third spring 50 with the first spring arrangement 26 moving the valve member 18 upwardly as well. The consequence of this is that the pin-shaped extension 20a of the actuation means 20 penetrates the passage 46a in the valve seat 46 to such an extent that the valve member 22 is lifted off the valve seat 46 and thereby makes a flow connection between the third connection 36 and the fourth connection 38 via the annular duct 18d, the chamber 60, the passages arranged in the face 18' of the valve member 18, the central passage 14a and the space 48. The first connection 32 and the connection 34 remain blocked with respect to the passage 24.

Figure 2D:
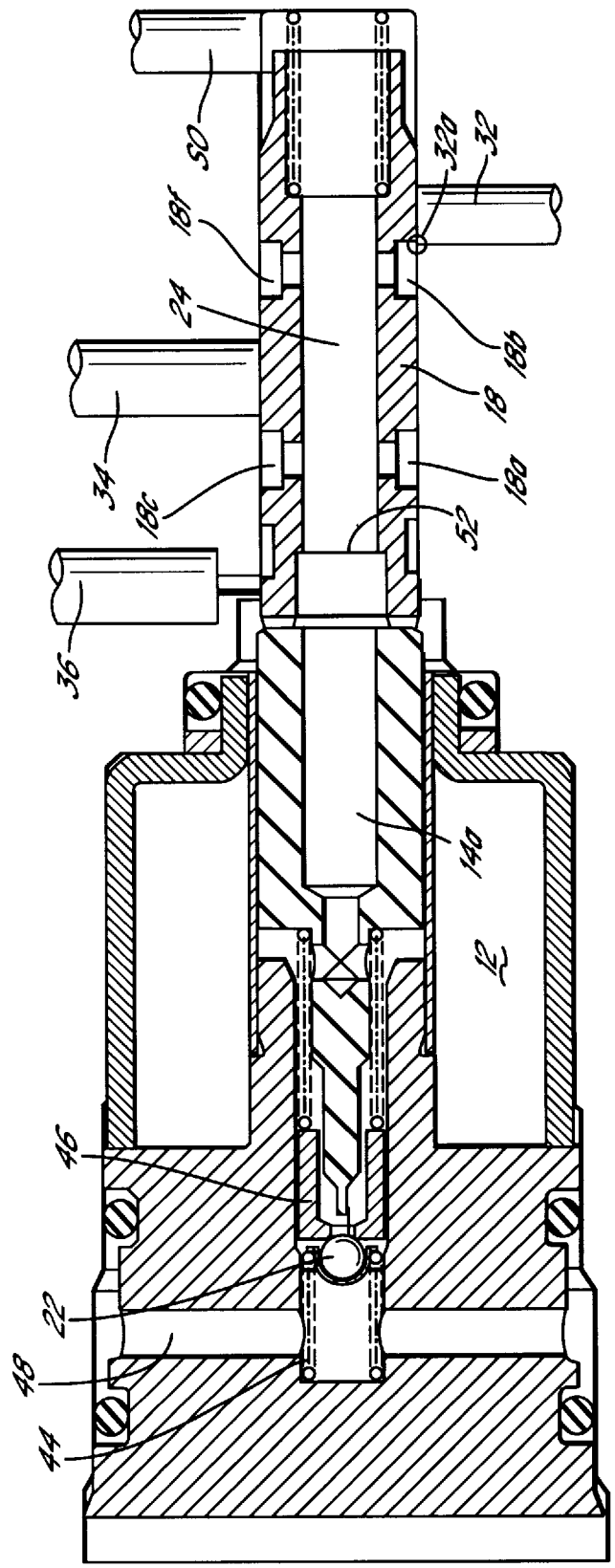

In the fourth position (IV.) of the valve arrangement as shown on FIG. 2d the coil 12 is applied with a current $I_0$ of such an amperage that the armature 14 and the first valve member 18 assume the position which is offset compared to the not actuated position shown in FIG. 2a by the upwardly and axially shifted distance so. In general, the following relation applies for both the actuating currents in the three positions (FIGS. 2b, 2c, 2d) and the actuation distances $s_0$, $s_1$, $s_2$:

$I_0 < I_1 < I_2$;

$s_0 < s_1 < s_2$.

In the fourth position (IV.) which has been shifted by the distance $s_0$, the second valve member 22 is again urged onto the valve seat 46 by the second spring 44 because the pin-shaped extension 20a of the actuation means 20 together with the armature 14 have moved downwardly again. As a result, the fourth connection 38 is blocked again. The first connection 32 is arranged with respect to the annular duct 18f in such a manner that an entrance of the pressure medium into the passage 24 via the connection 32 is enabled. The point of entrance has the function of a control edge 32a. The second connection 34 is offset in an axial direction with respect to the annular duct 18e in such a manner that said duct is blocked. The third connection 36 communicates via the annular duct 18d with the chamber 60 which is connected with the passage 24 via the passages arranged in the face 18' of the valve member 18. This establishes a flow connection from the first connection 32 to the third connection 36 via the diaphragm 52 which is arranged in the passage 24.

In the (balanced) control position (IV.) in which the armature 14 is lifted off the rest position by the distance $s_0$ there is an equilibrium of the forces between the first spring arrangement F26, the third spring arrangement F50, the force of the electromagnet arrangement F12 and the force F52 from the pressure medium, which is generated by the flow at the diaphragm 52. The flow of the pressure medium at the diaphragm 52 and consequently the pressure build-up gradient at the third connection 36 can be varied in this manner.

A variation of the current $I_0$ through the coil 12 within the range $0 \leq I_0 < I_1$ causes a corresponding variation of the electromagnetic force F12. Due to the fact that the spring forces F26 and F50 are only dependent on the distance $s_0$ which in the control position (IV.) can be assumed to be nearly constant, a variation of the force F52 which is generated by the flow at the diaphragm 52 is effected due to the equilibrium of the forces by a variation of the electromagnetic force F12, which determines the volumetric flow through the diaphragm 52 via the pressure difference prevailing at the diaphragm 52. The consequence of this is that with a low current through the coil 12 a higher pressure build-up gradient, and with a higher current through the coil 12 a smaller pressure build-up gradient is obtained.

The average cross-section at the control edge 32a and thus the distance $s_0$ is influenced within negligible limits by the viscosity of the pressure medium, the clearance between the valve member 18 and the wall of the hole 28 as well as by the pressure difference which prevails between the first connection 32 and the third connection 36.

The proportional magnet can be controlled by current, voltage or pulse width modulation signals (via the electric controller) in order to assume the respective positions rapidly and with positional accuracy. The position for opening the second valve member 22, in particular, can be assumed by briefly exceeding the current or the voltage, respectively.

In a preferred embodiment of the invention the total stroke of the armature is 2.5 mm. The distance $s_0$ (FIG. 2d) accounts for 1.5 mm, a safety margin in order to enable the first valve member 18 in the position $s_1$ to reliably seal the annular duct 18f against the first connection 32 (FIG. 2b) for 0.75 mm, and the difference between $s_1$ und $s_2$ by which the second valve member 22 is lifted off its valve seat 46 (FIG. 2c) for 0.25 mm.

Figure 3:
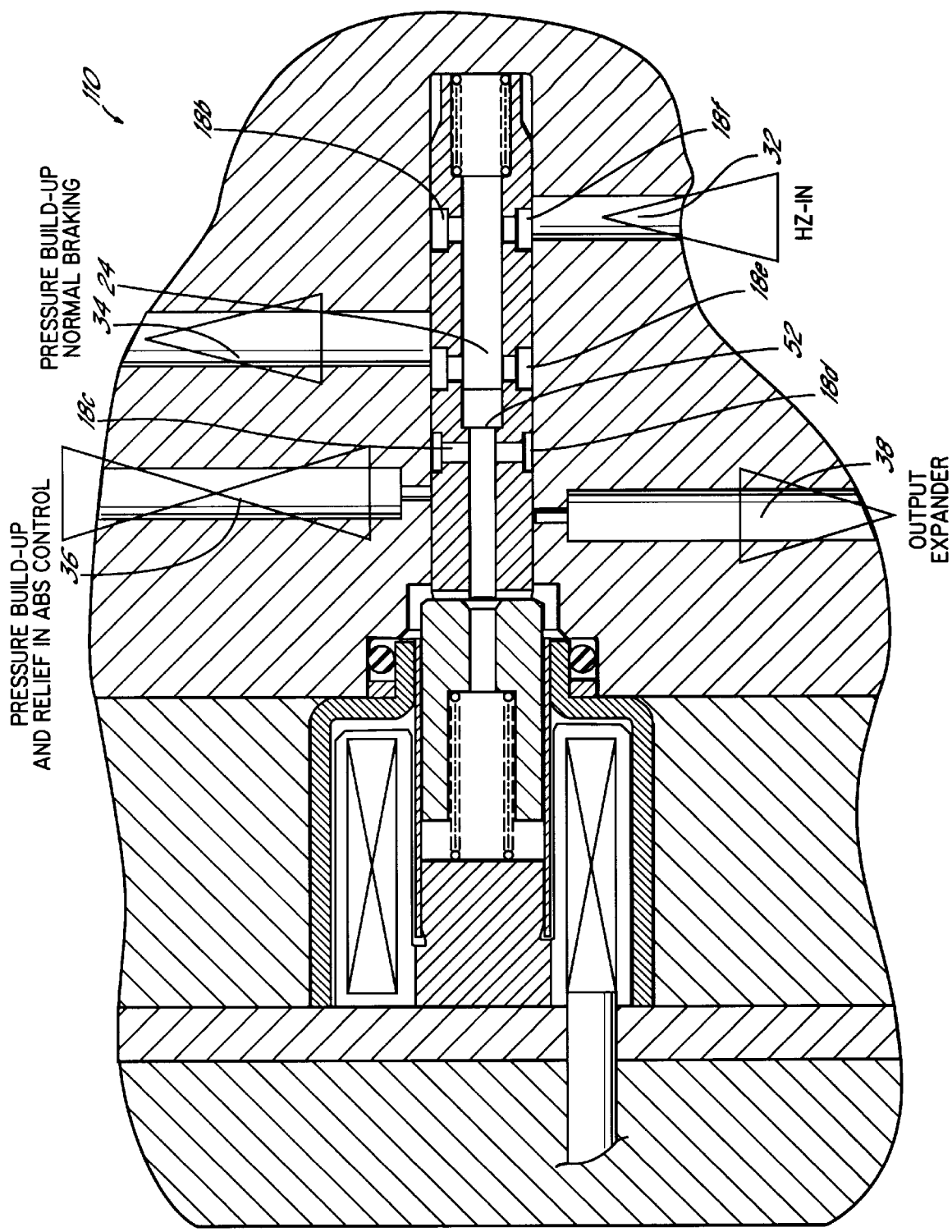

FIG. 3 illustrates a second embodiment of the electromagnetic valve arrangement with the second valve member 22, the second spring 44, the valve seat 46, the actuation means 20 with the pin-shaped extension 20a, and the passages 14a in the armature 14 having been omitted in that the fourth connection 38 is connectable with the passage 24 via the first annular duct 18d and a third passage 18c which branches off therefrom, with the third passage 18c entering the area of the passage 24, which is defined by the diaphragm 52 and the aramature 14. The omission of the second spring arrangement 44 requires a smaller magnetic force compared to the embodiment according to FIG. 1 for bringing the arrangement into the third control position (III.) which enables further omissions in the design of the electromagnet arrangement and its electric controller. The valve arrangements according to FIGS. 1 and 3 are otherwise identical in construction and function so that a repeated detailed description can be omitted.

Figure 4:
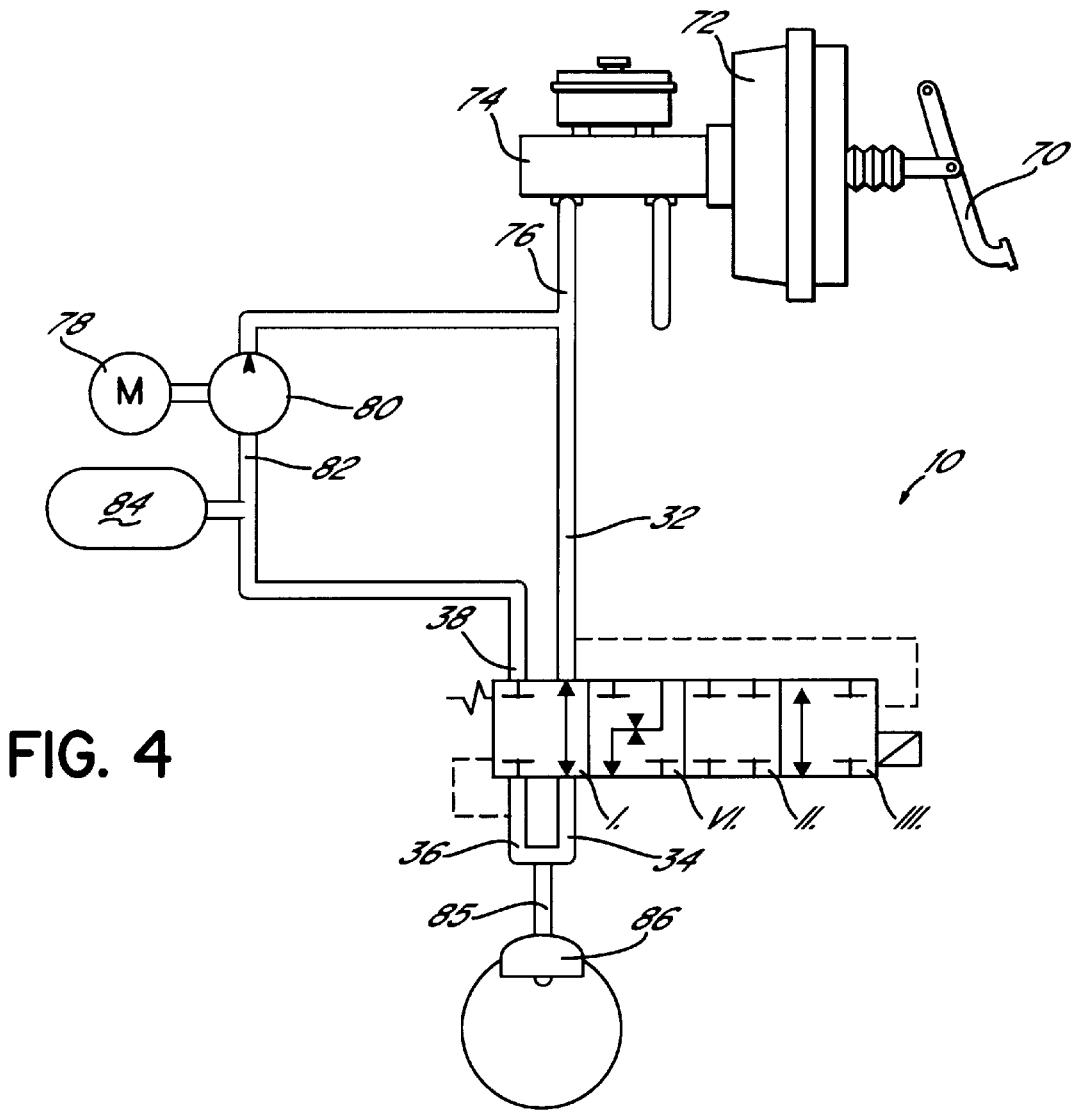
FIG. 4 shows a vehicle braking system with an electromagnetic valve arrangement according to FIG. 1, 3, 8 or 9.

The vehicle braking system shown in FIG. 4 comprises an electromagnetic valve arrangement according to FIG. 1 or FIG. 3. A pneumatic brake booster 72 which is actuated via a brake pedal 70 actuates a master cylinder 74 which is connected with the first connection 32 of the valve arrangement 10 via a line 76. A branch 76a which is branched off the line 76 leads to the suction side of a pump 80 which is operated by an electric motor 78 and which is connected with a pressure accumulator 84 and the fourth connection 38 via a line 82. The second and third connection 34, 36 of the valve arrangement 10 are combined and lead to a wheel brake 86 via a line 85.

Figure 5:
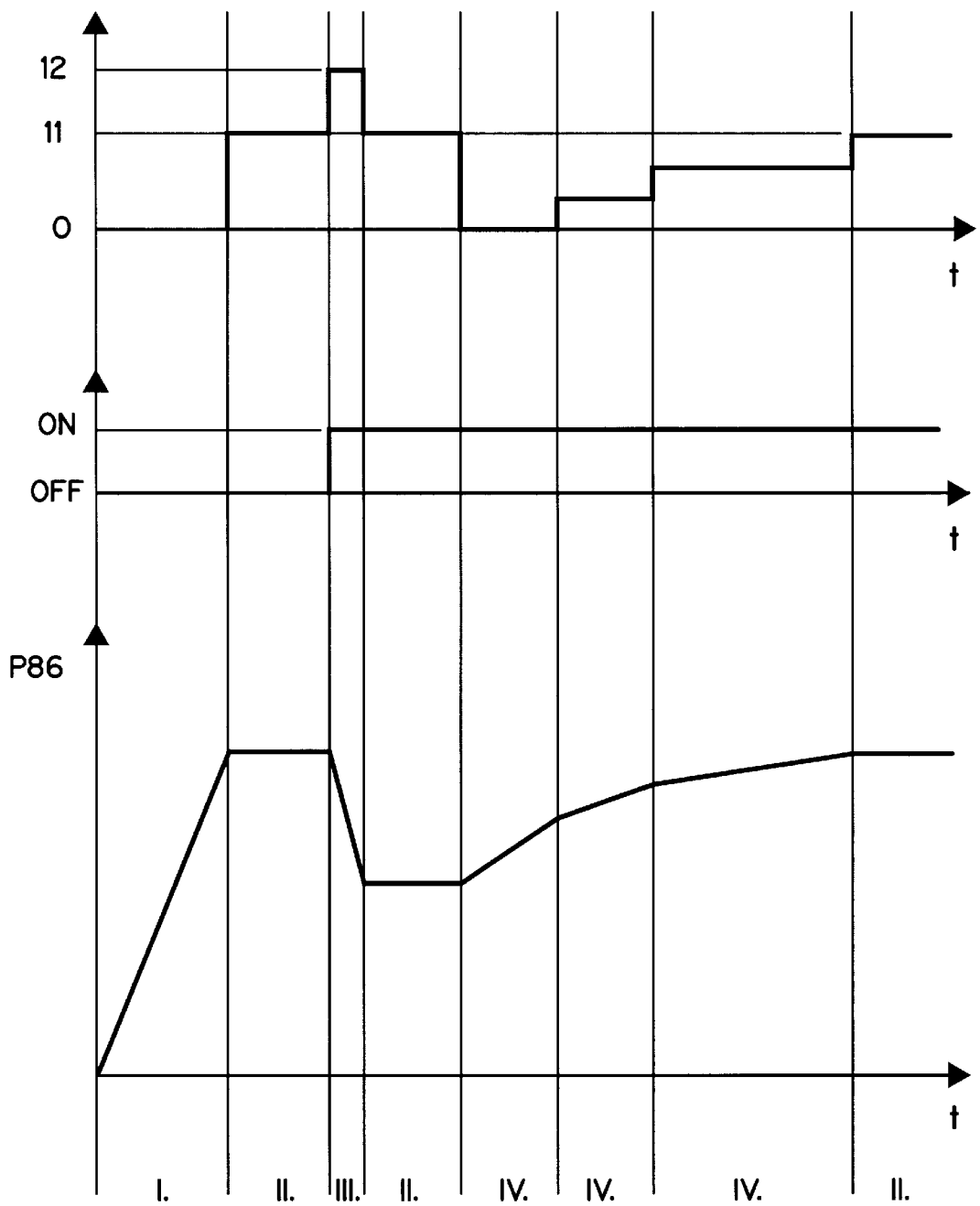
FIG. 5 shows the sequence diagram of an antilock control as a function of the actuation of the electromagnetic valve arrangement, the actuation of the pump motor and the braking pressure of the wheel brake resulting therefrom.

The diagrams of FIG. 5 illustrate the sequence of an antilock control system of a vehicle braking system according to FIG. 4. The uppermost diagram shows the current distribution in the coil 12, the diagram in the middle shows the actuation of the motor 78 of the pump 80, and the lowermost diagram shows the pressure distribution in the line 85, i.e. at the wheel brake 86.

On the basis of the first position (I.) for normal braking operations in which the valve arrangement has the position shown in FIG. 2a, a switching operation into the second position (II.) (see FIG. 2b) is effected by means of a current $I_1$ at the coil 12 upon the detection of a locking tendency of the wheels. The braking pressure in the brake 86 is thereby maintained constant. If no antilock control action is required, a reverse switching operation into the normal position is effected by turning off the current to zero (FIG. 2a). If an antilock control action is required, it must be initiated via a first pressure relief phase. This is done by increasing the current to the value $I_2$ at the coil 12 so that the valve arrangement assumes the position (III.) shown in FIG. 2c, in order to allow the brake fluid to flow from the brake 86 into the pressure accumulator 84. Simultaneously with the initiation of the first pressure relief phase the motor 78 of the pump 80 is acitivated for the duration of the antilock control action in order to return the brake fluid from the pressure accumulator 84 into the brake circuit 76. On the basis of this third position (III.) it is possible to switch to the second position (II.) as shown in FIG. 5 as well as directly to the fourth control position (IV.) according to FIG. 2d. In the fourth position (IV.) different pressure build-up gradients can be set by varying the current through the coil 12 so that the pressure build-up gradient under approaching the locking pressure level can be continuously reduced during the pressure build-up phase as shown in FIG. 5 in order to obtain a nearly ideal pressure distribution at the wheel brake 86. As a result of intentional changes between the positions 2b, 2c, 2d the braking pressure can be modulated in any desired way by means of setting the pressure keeping, pressure relief and particularly the pressure build-up phase with a variable pressure build-up gradient.

The function of the inventive electromagnetic valve arrangement will now be described by means of a balance of forces at the armature 14. The consideration includes the spring force F26 which is generated by the first spring arrangement 26, the electromagnetic force F12 which is generated by the coil 12, the differential pressure force F52 which is generated at the diaphragm 52 due to the flow of the pressure medium as well as the force of the third spring arrangement F50. The spring force F50 is counteracted by the magnetic force F12, the differential pressure F52 and the spring force F26. The spring force F26 results from the spring constant c26 and the position of the armature 14 along the axis A, the spring force F50 results from the spring constant c50 and the position of the armature 14 along the axis A, the magnetic force F12 is a function of the current flowing through the coil 12, and the force F52 which results from the pressure difference at the diaphragm 52 is proportional to the square root of the volumetric flow through the diaphragm 52.

In the position for normal braking as shown in FIG. 2a the coil 12 is without current, there is no pressure difference at the diaphragm 52 so that the magnetic force F12 and the force of pressure F52 are zero. Due to the fact that the first and the third spring 26, 50 are biased, with the biasing force F0,50 of the spring 50 exceeding the biasing force F0,26 of the spring 26, the armature 14 and thus the first valve member 18 are urged into the not actuated position.

In the position shown in FIG. 2b the pressure difference is still zero so that the force F52 is zero. The magnetic force F12 is selected by the suitable selection of the current $I_1$ in such a manner that under consideration of the two spring constants c26, c50 and thus of the two biasing forces F0,26 and F0,50 the armature 14 and thus the first valve member 18 are moved along the axis A by the distance $s_1$. Due to the fact that no pressure drop occurs at the diaphragm 52 and thus no flow of the pressure medium, the possibility exists to return to the basic position 2a.

In the position shown in FIG. 2c the pressure difference is still zero so that the force F52 is zero. The current through the coil 12 is selected in such a manner that under consideration of the spring constants c26, c50, of the biasing forces F0,26 and f0,50, as well as of the spring force F44 of the second spring arrangement which results from its biasing force F0,44, its spring constant c44 as well as from the stroke of the second valve member 22, the armature 14 and the first valve member 18 move along the axis A by the distance $s_2$.

The biasing force F0,26 of the first spring 26 is designed such that it is greater than or at least equal to the force which results from the spring constant c26 and the distance $s_2$. It is thereby ensured that the armature 14 and the first valve member 18 are invariably contacting each other at their common faces 14', 18' over the actuation distance $0 \leq s \leq s_2$ upon which the arrangement is based.

In order to be able to build up the braking pressure in a controlled way the armature 14 and the first valve member 18 must have assumed the control position shown in FIG. 2d in which the armature 14 and the first valve member 18 are offset from their basic position along the axis A by the distance $s_0$. The sum of the forces F52 and F12 thereby equals the sum of the two spring constants c26 and c50 multiplied by the distance s0 plus the difference between the biasing forces F0,50 and F0,26. Due to the fact that the force F52 is proportional to the volumetric flow through the diaphragm 52 as already mentioned, the pressure build-up gradient can be varied by varying the current I through the coil between zero and $I_1$.

FIG. 6 shows a third embodiment which is identified by 110 of the electromagnetic valve arrangement, comprising a fifth connection 100 which is associated with the third annular duct 18f and can therefore be connected with the passage 24 via the second radial passage 18b. An addition, a fifth control position (V.) is therefore available in which the third connection 36 and the fifth connection 100 communicate with each other, and the first connection 32, the second connection 34 and the fourth connection 38 are blocked. This fifth connection (V.) is assumed with the coil 12 being currentless under the action of the spring force resulting from the first and third spring arrangement 26, 50 and thus constitutes the not actuated basic position as shown in FIG. 6. On the basis of the basic position, the same connections between the connections 32, . . . , 38 according to the control positions I., II., III., and IV. of the embodiments of FIG. 1 or FIG. 3 can be made, with the coil 12 being correspondingly supplied with current and the fifth connection 100 always being blocked. The embodiment according to FIG. 6 is otherwise identical with the embodiments according to FIG. 1 or FIG. 3 so that a more detailed description is not required.

The vehicle braking system shown in FIG. 7 comprises an electromagnetic valve arrangement 110 according to FIG. 6. This is a so-called "brake by wire" system in which the driver's demand at a brake pedal 70 which is connected with a distance simulator 101 is sensed by means of a sensory system (not shown), is supplied to an electronic controller (not shown) in the form of electric signals where it is evaluated and utilised for the generation of electrical driving signals for driving the valve arrangement 110 and a motor-operated pump 105. A system of this type therefore also permits braking actions which are independent of the driver's demand, in particular anti-slip control and/or driving dynamics controls.

The braking pressure which is required for the braking operation is provided by a unit which consists of the hydraulic pump 105 and a pressure accumulator 106. For this purpose the inlet side 105a of the pump 105 is connected with a reservoir 107 for drawing in hydraulic fluid, while the outlet side 105b of the pump 105 has a direct connection with the connection 106a of the pressure accumulator 106. In order to protect the system a pressure limiting valve 108 is arranged between the inlet side 105a and the outlet side 105b of the pump 105, which limits the pressure in the accumulator 106 to a pregiven limit. In order to be able to keep the pressure in the accumulator 106 the pump 105 is designed to hold the pressure, which is achieved in a suitable manner by means of non-return valves or a self-locking drive.

In order to modulate the braking pressure in the wheel brake 86 in its function as an actuating member the valve arrangement 110 has the following connection assignment. The second and third connection 34, 36 are combined and connected with the brake 86 via a line 85. The first connection 32 is connected with the outlet 106a of the pressure accumulator 106, the fourth and the fifth connection 38, 100 are connected with the reservoir 107.

In the currentless basic position (V.) the wheel brake 86 is directly connected with the reservoir 107 while the connections 32, 36, 38 are blocked so that no braking pressure is applied to the wheel brake 86 and the associated vehicle wheel is freely running. When the electronic controller requests a braking action, switching between the control positions I. (uncontrolled pressure build-up phase), II. (pressure keeping phase), III. (pressure relief phase) and IV. (controlled pressure build-up) is carried out in such a manner that any desired pressure distribution at the wheel brake 86 can be set. In view of the fact that the fifth connection 100 is invariably blocked and with the exception that, compared with FIG. 4, the braking pressure is provided by the pressure accumulator 106 instead of the master cylinder 74, the function of the valve arrangement 110 in the control positions I., II., III., and IV. corresponds to that of the embodiments according to FIG. 1 or FIG. 3.

The main characteristic of the embodiments according to FIGS. 8 and 9 is that the arrangement of the first valve member 18 and of the electromagnet arrangement 12, 14 along the centre axis A is reversed with respect to the embodiments according to FIGS. 1, 3 and 6. This results in the advantages that the valve arrangement is more compact and thus requires less installation space, on the one hand, and that the coil 12 of the electromagnet arrangement 12, 14 is arranged outside the housing 30, on the other hand, so that the electrical contacting of the coil 12 which is required for the operation of the electromagnet arrangement 12, 14 can be effected in a simpler and more reliable way.

In the embodiments according to FIGS. 8 and 9 the first valve member 18 is biased against the actuation direction B of the armature 14 under the influence of the third spring arrangement 50 which bears against a shoulder 28a of the cylindrical hole 28. The armature 14 bears against a dome-shaped lid 200. The dome-shaped lid 200 is permanently connected with the supporting body 201 which is provided for the electromagnet arrangement 12, 14. For this purpose, the dome-shaped lid 200 is preferably caulked with the supporting body 201 at the point 200a. This results in the advantage that during the assembly of the valve arrangment the axial magnetic air gap or the biasing force of the third spring arrangement 50, too, can be precisely adjusted prior to caulking.

In addition, the first spring arrangement 26 is omitted in the embodiments according to FIGS. 8 and 9 compared to the embodiments according to FIGS. 1, 3 and 6. With the valve arrangement functioning in the control position (IV.) the balance of forces therefore includes the electromagnetic force F12 which is generated by the coil 12, the differential pressure force F52 which is generated at the diaphragm 52 due to the flow of the pressure medium as well as the force of the third spring arrangement F50. Due to the fact that in this case, too, the spring force F50 only depends on the distance which can be assumed to be nearly constant in the control position (IV.), a variation of the force F52 which is generated by the flow at the diaphragm 52 and which, via the pressure difference at the diaphragm, determines the volumetric flow through the diaphragm 52 is effected due to the equilibrium of forces by a variation of the electromagnetic force F12. Hence the omission of the first spring arrangement 26 does not lead to any functional changes of the valve arrangement.

As in the case of the embodiment according to FIG. 1 the embodiments according to FIGS. 8 and 9 comprise a valve member 22 which cooperates with a valve seat 46 for blocking or opening, respectively, the fourth connection. The valve member 22 is pressed against the valve seat 46 by a second spring arrangement 44 in order to block a passage 46a which is formed in the valve seat 46. The valve seat 46 is sleeve-shaped and arranged coaxially with the axis A so that it surrounds the second spring arrangement 44. At the side opposite the passage 46a the sleeve-shaped valve seat 46 has an inwardly drawn collar against which the second spring arrangement 44 bears. In this manner, the valve member 22, the valve seat 46 and the second spring arrangement 44 constitute a valve assembly 205 which can be handled independently and which is assembled with an interference fit in the area of the hole 28 whose diameter is reduced by the shoulder 28a.

In the embodiment according to FIG. 1 an actuation means 20 is connected with the armature 14, which at its front end comprises a pin-shaped taper 20a for lifting the valve member 22 off the valve seat 46 against the force of the second spring 44. An immediate actuation of the valve member 22 by the armature 14 is, however, not possible with the embodiments according to FIGS. 8 and 9 due to the arrangement of the first valve member 18 and the electromagnet arrangement 12, 14 which is reversed as compared with FIG. 1. Although the first valve member 18 is operationally coupled with the armature 14, the connection of an actuation means 20 with the first valve member 18 would, however, prove disadvantageous because it would increase the inertia of the first valve member 18 which would interfere with the above-mentioned balance of forces in the control position (IV.) and thus affect the function of the valve assembly. In particular, an interference of the balance of forces in the control position (IV.) due to transverse forces acting on the first valve member 18 must be avoided. In order to solve this problem each of the embodiments according to FIGS. 8 and 9 shows different actuation conditions of the valve member 22.

In the embodiment according to FIG. 8 a sleeve 210 is arranged between the armature 14 and the first valve member 18 for their operational coupling, the sleeve consisting of an anti-magnetic material and being guided in the supporting body 201 coaxially with the axis A. The sleeve 210 also comprises transverse holes 210a, 210b through which hydraulic fluid can flow upon a movement of the armature 14 or the first valve member 18, respectively, so that a balanced pressure is always ensured. The first valve member comprises an axially arranged pressure reduction stage 52 in the passage 24 via which, in the control position (IV.) hydraulic fluid from the first connection 32 can flow to the third connection 36 via a radially arranged passage 211.

At the side of the first valve member 18, which faces towards the valve assembly 205, a central locating means 212 is formed for locating a pin-shaped actuation element 22a for the valve member 22. The pin-shaped actuation element 22a is integrally connected with the valve member 22 and penetrates the passage 46a in the valve seat 46 by forming an annular gap. An actuation of the valve member 205 is effected by subjecting the coil 12 to a current $I_2$ with such an amperage that the armature 14 moves the first valve member 18 against the force of the third spring arrangement 50 in the direction of the valve member 22 until, firstly, the pin-shaped actuation element 22a is located in the locating means 212 and, subsequently, the valve member 22 is shifted against the force of the second spring arrangement 44. As a result, the valve arrangement assumes the third position (III.) according to FIG. 2c, with the third connection 36 being in flow connection with the fourth connection 38.

When employing the valve arrangement in the braking system with antilock control illustrated in FIG. 4 the braking pressure in the brake 86 is relieved in the third position (III.) because the hydraulic fluid can flow from the brake 86 into the pressure accumulator 84. In order to reduce the braking distance, a throttling of the pressure relief is required in many cases. A throttling effect which serves this purpose can be achieved by correspondingly dimensioning the annular gap which is formed by the pin-shaped actuation element 22a and the passage 46a. Due to the fact that the pin-shaped actuation element 22a and the passage 46a in the valve seat 46 are integral components of the valve assembly 205 which can be handled independently, a vehicle-specific dimensioning of the throttling effect can be achieved as desired by correspondingly designing the valve assembly 205 so that all other components of the valve assembly can be manufactured as standard components, i.e. independent of the vehicle. This advantage is of significance in particular in instances in which differently dimensioned throttling at the individual vehicle axles is desired because in this case it is only necessary to use differently designed valve assemblies 205 for the valve arrangements which are associated with the individual vehicle axles.

In the embodiment according to FIG. 9 the actuation of the valve member 22 is effected via an actuating member 220. The actuating member 220 is arranged axially with the first valve member 18 and sealed by means of an annular sealing element 221, for example a plastic ring (e.g. made from Teflon). The pressure reduction stage is guided here in a radially outward direction. At the side facing the armature 14 the actuating member 220 has a triangular profile as can be seen from FIG. 9a. By reducing the radius of the enveloping circle of the triangular profile of the actuating element 220 a shoulder 220a is generated via which the actuating member 220 moves the first valve member 18 in the actuation direction B upon the actuation of the armature 14. At its front end the actuating member 220 has the shape of a pin 220b for actuating the valve member 22.

In the embodiments according to FIGS. 8 and 9 the valve seat 46 is fitted with an interference fit, as already mentioned. The advantage of this is that in order to set the valve stroke for lifting the valve member 22 off the valve seat 46 the valve seat 46 is pressed into its installed position in the actuated position which corresponds to the third position (III.) so that a compensation of tolerances is achieved in a simple manner.

As with the vehicle braking system schematically shown in FIG. 4, the vehicle braking system which is schematically shown in FIG. 10 comprises an electromagnetic valve arrangement 10 according to FIG. 1, 3, 8 or 9, by means of which the braking pressure in the wheel brake 86 can be modulated as desired by adjusting the pressure keeping, pressure relief and, in particular, pressure build-up phases with a variable pressure build-up gradient.

Compared to the vehicle braking system schematically shown in FIG. 4, which primarily serves as an antilock control, the vehicle braking system schematically shown in FIG. 10 is extended in order to be particularly suited for an anti-slip as well as a driving dynamics control. For this purpose a valve arrangement 10a which is modified compared to the valve arrangement 10 is arranged in the line 76 which connects the master cylinder 74 with the first connection 32 of the valve arrangement 10 which, like the valve arrangement 10, comprises a first, second, third, and fourth connection 32a, 34a, 36a, 38a. The first and fourth connection 32a, 38a of the modified valve arrangement 10a are connected with the master cylinder 74, the second connection 34a of the modified valve arrangement 10a is connected with the first connection 32 of the valve arrangement 10, and the third connection 36a of the modified valve arrangement 10a is connected with the suction side 80e of the pump arrangement 78, 80.

The valve arrangement 10a is modified compared to the valve arrangement 10 only in that the first connection 32a, the second connection 34a, the third connection 36a and the fourth connection 38a are blocked in the fourth position (IV.).

This means that the fourth position (IV.) corresponds to the third position (III.). Here, the first position (I.) is the not actuated basic position as in the case of the valve arrangement 10. Similarly, the second position (II.) or the third position (III.), respectively, are set in accordance with a certain supply current via a current $I_1$ or a current $I_2$, respectively.

The modification can be achieved in a simple manner in the area of the pressure reduction stage 52 at the first valve member 18. If, for example, the pressure reduction stage 52 is formed as a bore with a predetermined diameter, then the modification can be effected by omitting this bore. If a separate diaphragm is employed for the pressure reduction stage 52, then the modification can be effected by installing a fluid tight seal instead of the diaphragm.

With the exception of this simple modification in the area of the pressure reduction stage 52, the valve arrangements 10, 10a are basically of identical construction. Due to the fact that for a vehicle braking system with two braking circuits for the supply of two wheel brakes each, which system as in FIG. 10 is also extended for an antislip as well as a driving dynamics control, a total of six electromagnetic valve arrangements 10, 10a (one modified valve arrangement 10a per braking circuit and one valve arrangement 10 per wheel brake) is required, significant cost advantages can be achieved because of the standardised use of constructionally identical electromagnetic valve arrangements 10, 10a. Moreover, the so-called modulator unit in which the electromagnetic valve arrangements 10, 10a and the pump arrangement(s) 78, 80 are combined in a known manner can be designed so as to be compact and requiring less installation space. In addition, savings can be achieved in the area of the electronic controller (not shown). On the one hand, the electronic components such as driving circuits, power output stages, monitoring circuits as well as the software for the operation of the electromagnetic valve arrangements 10, 10a can be made as standardised and consequently economical components. On the other hand the electronic controller (not shown) can be designed so as to be compact and requiring less installation space because electronic components for a total of only six valve arrangements 10, 10a are required.

The vehicle braking system which is schematically shown in FIG. 10 also differs from the vehicle braking system which is schematically shown in FIG. 4 in that a first non-return valve 92 is arranged between the accumulator 84 and the suction side 80e of the pump arrangement 78, 80, via which a flow connection can be made only in the direction from the accumulator 84 to the suction side 80e of the pump arrangement 78, 80, a second non-return valve 90 is arranged between the first or the fourth connection 32a, 38a, respectively, and the second connection 34a, via which a flow connection can be made only in the direction from the master cylinder 74 to the first connection 32 of the valve arrangement 10, and a pressure limiting valve 91 is arranged between the first or the fourth connection 32a, 38a, respectively, and the second connection 34a, via which a flow connection from the pressure side 80a of the pump arrangement 78, 80 to the master cylinder 74 can be made, if the pressure at the pressure side 80a of the pump arrangement 78, 80 exceeds a preset limit.

The vehicle braking system which is schematically shown in FIG. 10 is preferably also characterised in that the brake booster 72 can be actuated via an electromagnet arrangement 72a independent of an actuation of the brake pedal 70.

For normal braking operations and for an antilock control the modified valve arrangement 10a assumes the first (not actuated) position (I.) in which there is a connection from the master cylinder 74 to the first valve arrangement 10 or to the wheel brake 86, respectively, while the connection from the master cylinder 74 to the suction side 80e of the pump arrangement 78, 80 is blocked. The sequence of an antilock control corresponds to the embodiment according to FIG. 4. In the embodiment according to FIG. 10 the first (not actuated) position (I.) is also set when the brake booster 72 is actuated via the electromagnet arrangement 72a in order to carry out an emergency or an intentional braking operation, respectively.

For an anti-slip control the modified valve arrangement 10a assumes the third position (III.) in which there is a connection from the master cylinder 74 to the suction side 80e of the pump arrangement 78, 80 while the connection from the master cylinder 74 to the first connection 32 of the valve arrangement 10 or the wheel brake 86, respectively, is blocked. The pump arrangement 78, 80 can draw in brake fluid via the master cylinder 74 and supply it immediately to the first connection 32 of the valve arrangement 10 or the wheel brake 86, respectively, in order to counteract spinning of the associated vehicle wheel.

In a driving dynamics control which serves to improve the stability of the vehicle in particular when driving though a curve by means of automatic braking, the modified valve arrangement 10a is first switched to the third position (III.) in which there is a connection from the master cylinder 74 to the suction side 80e of the pump arrangement 78, 80, while the connection from the master cylinder 74 to the first connection 32 of the valve arrangement 10 or the wheel brake 86, respectively, is blocked. Simultaneously, the brake booster 72 is actuated via the electromagnet arrangement 72a, and the pump arrangement 78, 80 is operated. This effects prefilling of the pump 80 via its suction side 80e, thus resulting in an adequate pressure level already being provided during the startup phase at the pressure side 80a of the pump 80. After the startup phase of the pump 80, the actuation of the brake booster 72 via the electromagnet arrangement 72a is completely or partially reduced, and the modified valve arrangement 10a is switched to the second position (II.) in which both the connection from the master cylinder 74 to the first connection 32 of the valve arrangement 10 or the wheel brake 86, respectively, as well as the connection from the master cylinder 74 to the suction side 80e of the pump arrangement 78, 80 are blocked. While the modified valve arrangement 10a is in the second position (II.) the pressure is provided via the pump arrangement 78, 80 and the pressure modulation is effected in the known manner via the valve arrangement 10.

The first non-return valve 92 serves to prevent the brake fluid from escaping into the accumulator 84 during prefilling of the pump 80 when the modified valve arrangement 10a is in the third position (III.). It is also possible to utilise the prefilling of the pump 80 as described herein in connection with a driving dynamics control in an anti-slip control in order to enhance the performance.

During a driving dynamics control operation with the modified valve arrangement 10a being in the second position (II.) the second non-return valve 90 serves to enable the application of the wheel brake 86 with brake fluid from the master cylinder 74, if an actuation of the brake booster 72 is effected either via the brake pedal 70 or via the electromagnet arrangement 72a. This can, for example, be the case if the driver wants to abort a driving dynamics control in order to carry out an emergency or an intentional braking operation, respectively. In this manner the overall system safety is enhanced quite considerably.

In order to protect the vehicle braking system against damage and an associated failure the pressure limiting valve 91 serves to enable a pressure relief towards the master cylinder 74 if the pressure at the pressure side 80a of the pump arrangement 78, 80 exceeds a preset limit, with the connection between the master cylinder 74 and the first connection 32 of the valve arrangement 10 or the wheel brake 86, respectively—in the second and third position (II. and III.) of the valve arrangement 10—being blocked.

What is claimed is:

1. An electromagnetic valve arrangement, for a pressure medium of a vehicle braking system, comprising
    an electromagnet arrangement (12, 15) which is coupled with
        a valve closing means (18, 22) which can be brought into several positions (I., II., III., IV.);
        a housing (30) with a first, a second, a third, and a fourth connection (32, 34, 36, 38) of which
    in a first position (I.)
        the first connection (32) and the second connection (34) are in flow connection with each other, and
        the third connection (36) and the fourth connection (38) are blocked;
    in a second position (II.)
            the first connection (32), the second connection (34), the third connection (36), and the fourth connection (38) are blocked;
    in a third position (III.)
        the first connection (32) and the second connection (34) are blocked, and
        the third connection (36) and the fourth connection (38) are connected with each other; and
            in a fourth position (IV.)
                the first connection (32) and the third connection (36) are connected with each other, and
        the second connection (34) and the fourth connection (38) are blocked; characterised in that the valve closing means further comprises a first valve member (18) which is associated with a pressure reducer (52) which reduces the pressure prevailing in the pressure medium between at least two outlets (32,36).

2. The electromagnetic valve arrangement according to claim 1, characterised in that
    the valve closing means (18, 22) comprises a first valve member (18) which is coupled with an armature (14) of the electromagnet arrangement (12, 14).

3. The electromagnetic valve arrangement according to claim 2, characterised in that
    the valve closing means (18, 22) comprises a second valve member (22) and an actuation means (20) for the second valve member (22), which is preferably coupled with the armature (14) of the electromagnet arrangement (12, 14).

4. The electromagnetic valve arrangement according to claim 3, characterised in that
    the second valve member (22) is biased against a valve seat (46) by a second spring assembly (44).

5. The electromagnetic valve arrangement according to claim 2, characterised in that
    the first valve member (18) is biased against the armature (14) of the electromagnet arrangement (12, 14) by a first spring assembly (26).

6. The electromagnetic valve arrangement according to claim 5, characterised in that
    in an actuated position (III.) in which the valve closing means (18, 22) is deflected from the not actuated position (I.) to its maximum the spring force (F26) of the first spring arrangement (26) is greater than or equal to zero.

7. The electromagnetic valve arrangement according to claim 2, characterised in that
    the armature (14) of the electromagnet arrangement (12, 14) is biased against the actuation direction (B) of the first valve member (18) by a third spring arrangement (50).

8. The electromagnetic valve arrangement according to claim 7, characterised in that
    the third spring arrangement (50) bears against the housing (30) or the valve seat (46), on the one hand, and against the armature (14), on the other hand.

9. The electromagnetic valve arrangement according to claim 7, characterised in that
    a first spring arrangement (26) and the third spring arrangement (50) are biased in opposite directions against the armature (14) of the electromagnet arrangement (12, 14).

10. The electromagnetic valve arrangement according to claim 7, characterised in that
    a first spring arrangement (26) has a biasing force (F0, 26) which is smaller than the biasing force (F0, 50) of the third spring arrangement (50).

11. The electromagnetic valve arrangement according to claim 7, characterised in that
    in the case of an actuation of the electromagnet arrangement in order to bring the valve closing means from the first position (I.) In which the electromagnet arrangement (14, 14) is not actuated into another position (II., III., IV.) in which the electromagnet arrangement (12, 14) is actuated, the third spring arrangement (50) is compressible by the magnetic force (F12) of the electromagnet arrangement (12, 14), the spring force (F26) of a first spring arrangement (26) and a force (F52) which results from a pressure difference which may possibly prevail at the pressure reduction stage (52).

12. The electromagnetic valve arrangement according to claim 1, characterised in that
    the first valve member (18) comprises a passage (24) which, depending on the position of the valve member (18), can be brought into a flow connection with or disconnected from one or several of the first, second, third, or fourth connection (32, . . . , 38) via passages (18a, 18b, 18c) and/or annular ducts (18d, 18e, 18f).

13. The electromagnet valve arrangement according to claim 12, further comprising a diaphragm (52) in the passage (24) with a predeterminable passage for the pressure medium.

14. The electromagnetic valve arrangement according to claim 12, characterised in that
    the annular duct (18f) in the first valve member (18), which connects or disconnects, respectively, the first connection (32) with/from the passage (24), can be aligned in such a manner that when a pressure difference prevails at the pressure reduction stage (52) a certain flow area (32a) for the pressure medium entering the annular duct (18f) is obtained.

15. The electromagnetic valve arrangement according to claim 14, characterised in that
depending on the current through the electromagnet arrangement (12, 14) the flow of the pressure medium at the pressure reduction stage (52) can be varied in such a manner that with a low current through the electromagnet arrangement (12, 14) a higher pressure build-up gradient, and with a higher current through the electromagnet arrangement (12, 14) a smaller pressure build-up gradient is obtained at the downstream cutlet (36) which is associated with the pressure reduction stage (52).

16. The electromagnetic valve arrangement according to claim 1, characterised in that
the electromagnet arrangement (12, 14) comprises a proportional electromagnet which, on application of current of varying amperage, brings the valve closing means (18, 22) into different positions (I., . . . , IV.).

17. A vehicle braking system, comprising
an electromagnetic valve arrangement claim 1,
a brake booster (72) acting upon a master cylinder (74), which can be actuated via a brake pedal (70),
a pump arrangement (78, 80) for pressure medium which is associated with an accumulator (84) for the pressure medium, as well as at least one braking mechanism (86), characterised in that
the first connection (32) of the valve arrangement (10) is connected with the master cylinder (74),
the second and third connection (34, 36) of the valve arrangement (10) are connected with the braking mechanism (86), and
the fourth connection (38) of the valve arrangement (10) is connected with the pressure accumulator (84) and/or the pump arrangement (78, 80).

18. The electromagnetic valve arrangement according to claim 1, characterised in that
the valve closing means (18, 22) can be brought into a fifth position (V.) and
the housing (30) is provided with a fifth connection (100), so that—in the fifth position (V.)—,
the second connection (34) and the fifth connection (100) are in flow connection with each other and
the first connection (32), the third connection (36) and the fourth connection (38) are blocked.

19. The electromagnetic valve arrangement according to claim 18, characterised in that
the fifth connection (100) is blocked in the other positions (I., II., III., IV.).

20. A vehicle braking system, comprising
an electromagnetic valve arrangement (110) according to claim 19,
a sensor means (101) for sensing the static and dynamic conditions occurring at a brake pedal (70),
an electronic controller for generating control signals for the electromagnetic valve arrangement (110) as a function of the static and dynamic conditions occurring at the brake pedal (70),
a source (105, 106) supplying pressurised hydraulic fluid,
a reservoir (107) for pressure medium, as well as
at least one braking mechanism (86), characterised in that
the first connection (32) of the valve arrangement (110) is connected with the source (105, 106) supplying pressurised hydraulic fluid,
the second and the third connection (34, 36) of the valve arrangement (110) are connected with the braking mechanism (86), and
the fourth and fifth connection (38, 100) of the valve arrangement (110) are connected with the reservoir (107).

21. A vehicle braking system, comprising
an electromagnetic valve arrangement, for a pressure medium of the vehicle braking system, comprising
an electromagnet arrangement (12, 15) which is coupled with
a valve closing means (18, 22) which can be brought into several positions (I., II., III., IV.);
a housing (30) with a first, a second, a third, and a fourth connection (32, 34, 36, 38) of which
in a first position (I.)
the first connection (32) and the second connection (34) are in flow connection with each other, and
the third connection (36) and the fourth connection (38) are blocked;
in a second position (II.)
the first connection (32), the second connection (34), the third connection (36), and the fourth connection (38) are blocked;
in a third position (III.)
the first connection (32) and the second connection (34) are blocked, and
the third connection (36) and the fourth connection (38) are connected with each other; and
in a fourth position (IV.)
the first connection (32) and the third connection (36) are connected with each other, and
the second connection (34) and the fourth connection (38) are blocked characterized in that the valve closing means further comprises a first valve member (18) which is associated with a pressure reduction stage (52) which reduces the pressure prevailing in the pressure medium between at least two outlets (32,36);
a brake booster (72) acting upon a master cylinder (74), which can be actuated via a brake pedal (70),
a pump arrangement (78, 80) for pressure medium which is associated with an accumulator (84) for the pressure medium, as well as at least one braking mechanism (86), characterised in that
the first connection (32) of the valve arrangement (10) is connected with the master cylinder (74),
the second and third connection (34, 36) of the valve arrangement (10) are connected with the braking mechanism (86), and
the fourth connection (38) of the valve arrangement (10) is connected with the pressure accumulator (84) and/or the pump arrangement (78, 80);
further comprising a valve arrangement (10a) which comprises a first, second, third, and fourth connection (32a, 34a, 36a, 38a) with the first and fourth connection (32a, 38a) being connected with the master cylinder (74), the second connection (34a) being connected with the first connection (32) of the valve arrangement (10), and the third connection (36a) being connected with the suction side (80e) of the pump arrangement (78, 80).

22. The vehicle braking system according to claim 21, characterised in that in the fourth position (IV.) the first connection (32a), the second connection (34a), the third connection (36a), and the fourth connection (38a) are blocked.

23. The vehicle braking system according to claim 21, characterised in that a first non-return valve (92) is arranged between the accumulator (84) and the suction side (80e) of the pump arrangement (78, 80), via which a flow connection can be made only in the direction from the accumulator (84) to the suction side (80e) of the pump arrangement (78, 80).

24. The vehicle braking system according to claim 23, characterised in that a second non-return valve (90) is arranged between the first or the fourth connection (32a, 38a), respectively, and the second connection (34a), via which a flow connection can be made only in the direction from the master cylinder (74) to the first connection (32) of the valve arrangement (10).

25. The vehicle braking system according to claim 23, characterised in that a pressure limiting valve (91) is arranged between the first or the fourth connection (32a, 38a), respectively, and the second connection (34a), via which a flow connection from the pressure side (80a) of the pump arrangement (78, 80) to the master cylinder (74) can be made, if the pressure at the pressure side (80a) of the pump arrangement (78, 80) exceeds a preset limit.

26. A vehicle braking system, comprising an electromagnetic valve arrangement, for a pressure medium of the vehicle braking system, comprising an electromagnet arrangement (12, 15) which is coupled with a valve closing means (18, 22) which can be brought into several positions (I., II., III., IV.);

a housing (30) with a first, a second, a third, and a fourth connection (32, 34, 36, 38) of which in a first position (I.)

the first connection (32) and the second connection (34) are in flow connection with each other, and the third connection (36) and the fourth connection (38) are blocked;

in a second position (II.)

the first connection (32), the second connection (34), the third connection (36), and the fourth connection (38) are blocked;

in a third position (III.)

the first connection (32) and the second connection (34) are blocked, and the third connection (36) and the fourth connection (38) are connected with each other; and in a fourth position (IV.)

the first connection (32) and the third connection (36) are connected with each other, and the second connection (34) and the fourth connection (38) are blocked characterized in that the valve closing means further comprises a first valve member (18) which is associated with a pressure reduction stage (52) which reduces the pressure prevailing in the pressure medium between at least two outlets (32,36);

a brake booster (72) acting upon a master cylinder (74), which can be actuated via a brake pedal (70), a pump arrangement (78, 80) for pressure medium which is associated with an accumulator (84) for the pressure medium, as well as at least one braking mechanism (86), characterised in that the first connection (32) of the valve arrangement (10) is connected with the master cylinder (74), the second and third connection (34, 36) of the valve arrangement (10) are connected with the braking mechanism (86), and the fourth connection (38) of the valve arrangement (10) is connected with the pressure accumulator (84) and/or the pump arrangement (78, 80);

characterised in that the brake booster (72) can be actuated via an electromagnet arrangement (72a) independent of an actuation via the brake pedal (70).

* * * * *